United States Patent
Sera et al.

(10) Patent No.: US 10,906,021 B2
(45) Date of Patent: Feb. 2, 2021

(54) STAINLESS STEEL MEMBER AND PRODUCTION METHOD THEREOF

(71) Applicant: TOKUYAMA CORPORATION, Yamaguchi (JP)

(72) Inventors: Akira Sera, Yamaguchi (JP); Michihito Nakatani, Yamaguchi (JP); Yumiko Nakamura, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 0 days.

(21) Appl. No.: 16/976,842

(22) PCT Filed: Feb. 25, 2019

(86) PCT No.: PCT/JP2019/007054
§ 371 (c)(1),
(2) Date: Aug. 31, 2020

(87) PCT Pub. No.: WO2019/167885
PCT Pub. Date: Sep. 6, 2019

(65) Prior Publication Data
US 2021/0001303 A1    Jan. 7, 2021

(30) Foreign Application Priority Data
Mar. 2, 2018 (JP) ................................ 2018-037432

(51) Int. Cl.
*B01J 19/02* (2006.01)
*B01J 19/00* (2006.01)

(52) U.S. Cl.
CPC ........... *B01J 19/02* (2013.01); *B01J 19/0053* (2013.01); *B01J 2219/0286* (2013.01)

(58) Field of Classification Search
CPC . B01J 19/02; B01J 19/0053; B01J 2219/0286
(Continued)

(56) References Cited

U.S. PATENT DOCUMENTS

2017/0088910 A1* 3/2017 Jin .......................... C22C 38/04
2017/0252782 A1   9/2017 Koike et al.

FOREIGN PATENT DOCUMENTS

JP    H06172934 A    6/1994
JP    H07011421 A    1/1995
(Continued)

OTHER PUBLICATIONS

Notice of Reasons for Refusal issued in corresponding Japanese Application No. 2019-528154; dated Jun. 25, 2019 (4 pages).
(Continued)

*Primary Examiner* — Huy Tram Nguyen
(74) *Attorney, Agent, or Firm* — Osha Bergman Watanabe & Burton LLP

(57) ABSTRACT

The purpose of the present invention is to provide a stainless steel member and a production method thereof, said stainless steel member having a passivation layer formed on a surface of a base material formed from stainless steel, wherein the film thickness of the passivation layer is 2-20 nm, and the concentration of chromium atoms in the outermost surface of the passivation layer is 0.1-2.3 by atomic percentage. Also provided are a device or container, the liquid-contact part of which in contact with a semiconductor treatment liquid is formed from the stainless steel member, a semiconductor treatment liquid production method for producing the semiconductor treatment liquid by using the device, and a semiconductor treatment liquid storage method for storing the semiconductor treatment liquid in the container.

9 Claims, 1 Drawing Sheet

(58) Field of Classification Search
USPC .......................................................... 422/129
See application file for complete search history.

(56) References Cited

FOREIGN PATENT DOCUMENTS

| | | | |
|---|---|---|---|
| JP | H0739701 A | 2/1995 | |
| JP | H07268599 A | 10/1995 | |
| JP | H08269681 A | 10/1996 | |
| JP | 2004083965 A | 3/2004 | |
| JP | 200645659 A | 2/2006 | |
| JP | 2015521693 A | 7/2015 | |
| JP | 2017155314 A | 9/2017 | |
| WO | WO-2018003143 A1 * | 1/2018 | ............... C21D 1/76 |

OTHER PUBLICATIONS

Notice of Reasons for Refusal issued in corresponding Japanese Application No. 2019-528154; dated Oct. 8, 2019 (4 pages).
Notice of Reasons for Refusal issued in corresponding Japanese Application No. 2019-528154; dated Feb. 4, 2020 (4 pages).
International Search Report issued in corresponding International Application No. PCT/JP2019/007054; dated May 14, 2019 (1 page).
Written Opinion of the International Searching Authority issued in corresponding International Application No. PCT/JP2019/007054; dated May 14, 2019 (3 pages).

* cited by examiner

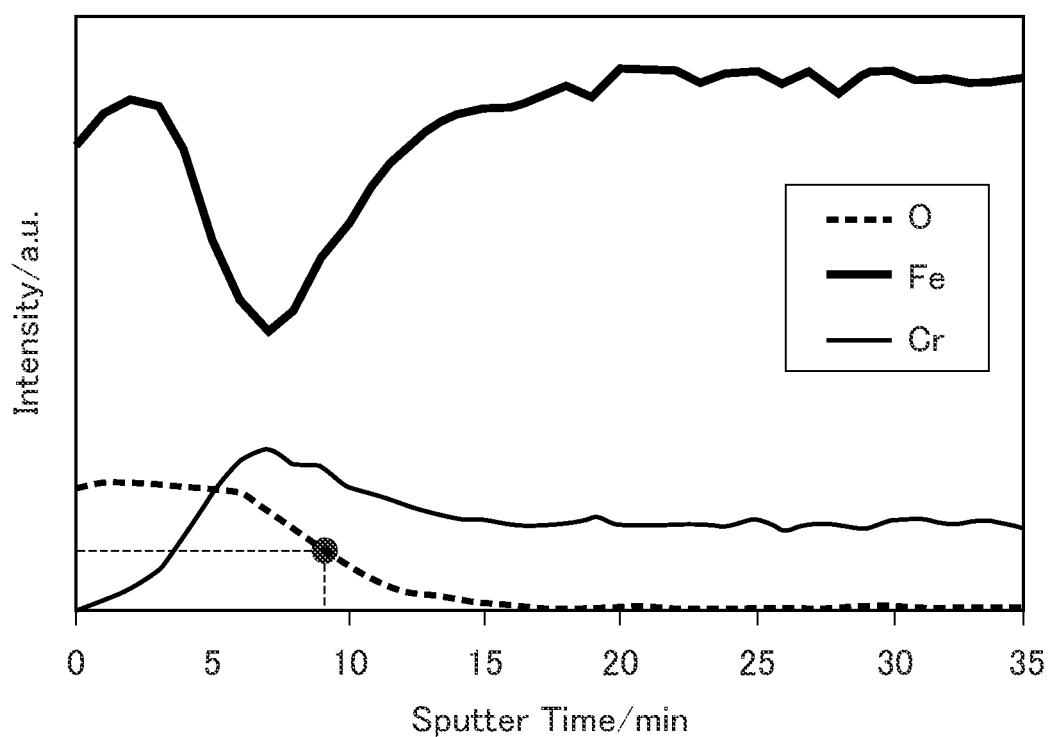

STAINLESS STEEL MEMBER AND PRODUCTION METHOD THEREOF

TECHNICAL FIELD

The present invention relates to a stainless steel member and a method for production thereof.

BACKGROUND ART

Metal impurities contained in various kinds of semiconductor treatment liquids are considered to cause problems, such as reduction in the yield of semiconductors. Therefore, various methods have attempted to reduce the metal impurities in the semiconductor treatment liquids. With the recent trend toward the finer design rules of the semiconductors, further reduction of the metal impurities is required. In particular, under the semiconductor design rule in which traces having a width of 20 nm or less are formed, the concentration of the metal impurities needs to be controlled at ppt level.

The metal impurities contained in the semiconductor treatment liquid are roughly classified into two kinds, namely, those mixed during production of the semiconductor treatment liquid, and those mixed during storage, filling, or transport of the semiconductor treatment liquid after the production. Thus, it is necessary to reduce not only the metal impurities mixed during the production of the semiconductor treatment liquid, but also the metal impurities newly generated during the storage, filling, and transport.

During the storage (including preservation) of the semiconductor treatment liquid, the metal impurities are considered to be mixed or increase due to elution of metal from a liquid contact portion of a tank or pipe used for the storage, or separation of metal as particles from the tank or the pipe. In order to reduce the elution or separation of metal, various methods have been proposed.

For example, Patent Document 1 describes SUS316L as one of preferred examples of a member for a distilling apparatus. Patent Document 1 also describes that when a surface of the member is smoothed by electropolishing or complex electropolishing, the elution of metal does not easily occur because an area in contact with liquid decreases.

Patent Document 2 discloses, as a highly corrosion-resistant stainless steel member for a semiconductor production apparatus, a stainless steel member having a passivation film which satisfies $Cr_2O_3/(Fe_2O_3+Cr_2O_3) \geq 0.65$ on its surface. Patent Document 2 also discloses a method of forming the passivation film in which a thermal treatment after immersion into nitric acid is performed in an extremely low oxygen atmosphere.

Patent Document 3 discloses, as a stainless steel member for high purity alcohol, a member having an iron-based oxide layer of a thickness of 100 Å to 200 Å on its surface that has been electropolished. Patent Document 3 describes that use of this member reduces the total amount of metal ions eluted into high purity alcohol to 10 ppt or less.

Patent Document 4 discloses a method of reducing metal elution from a stainless steel member. In this method, nitrogen gas and ozone gas are supplied to a passivation film which is made of chromium oxide and formed on a surface of a stainless steel material to produce chromium nitrate, and then chromium nitrate thus produced is evaporated.

Patent Document 1: Japanese Unexamined Patent Application, Publication No. H07-39701

Patent Document 2: Japanese Unexamined Patent Application, Publication No. H07-11421

Patent Document 3: Japanese Unexamined Patent Application, Publication No. H07-268599

Patent Document 4: Japanese Unexamined Patent Application, Publication No. 2017-155314

DISCLOSURE OF THE INVENTION

Problems to be Solved by the Invention

However, studies of the present inventors have revealed that the treatment method of Patent Document 1 only has the effect of reducing the metal elution as a result of reduction in the contact area with the liquid by the smoothing. Thus, the method can reduce the metal elution at ppb level, but cannot sufficiently reduce the metal elution at ppt level, leaving room for improvement.

The stainless steel member for the semiconductor production apparatus according to Patent Document 2 can reduce the metal elution, but cannot control elution of chromium, which is a main component of the passivation film, at ppt level, leaving room for improvement.

The stainless steel member for high purity alcohol of Patent Document 3 greatly reduces the metal elution as compared to members that have been buffed or electropolished, but still has room for improvement because several ppt of iron and manganese have eluted.

Further, even if the method of Patent Document 4 is employed, it is impossible to form a passivation film in which the concentration of chromium atoms in its surface is reduced to be equal to or lower than the concentration of chromium atoms contained in stainless steel as a base material. Thus, this method is also susceptible to improvement.

The present invention has been made in view of these circumstances, and it is an object of the present invention to provide a stainless steel member that can significantly reduce elution or separation of metal into a semiconductor treatment liquid when used as a liquid contact portion that makes contact with the semiconductor treatment liquid, and a method of producing the same.

Means for Solving the Problems

To achieve the object, the present inventors have conducted close studies of a passivation layer that makes contact with the semiconductor treatment liquid. As a result, the inventors have found that the concentration of chromium atoms in an outermost surface of the passivation layer has an influence on the elution or separation of metal, and have achieved the present invention.

A specific solution to the above-described object includes the following embodiments.

<1> A stainless steel member including:
a base material made of stainless steel; and
a passivation layer formed on a surface of the base material made of stainless steel,
wherein the passivation layer has a thickness of 2 nm to 20 nm, and a concentration of chromium atoms in an outermost surface of the passivation layer is 0.1 atomic % to 2.3 atomic %.

<2> The stainless steel member according to <1> which is for use in a part to be in contact with a semiconductor treatment liquid.

<3> The stainless steel member according to <1> or <2>, wherein a concentration of silicon atoms in the outermost surface of the passivation layer is 0.1 atomic % to 10 atomic %.

<4> The stainless steel member according to any one of <1> to <3>, wherein the passivation layer has a thickness of 3 nm to 20 nm.

<5> An apparatus or container having a part to be in contact with a semiconductor treatment liquid, wherein the part includes the stainless steel member according to any one of <1> to <4>.

<6> A method of producing a semiconductor treatment liquid, the method including:
using an apparatus having a part including the stainless steel member according to any one of <1> to <4>, wherein the part is brought into contact with the semiconductor treatment liquid.

<7> A semiconductor treatment liquid storing method, the method including:
storing a semiconductor treatment liquid in a container having a part including the stainless steel member according to any one of <1> to <4>, wherein the part is brought into contact with the semiconductor treatment liquid.

<8> A method of producing the stainless steel member according to any one of <1> to <4>, the method including:
forming the passivation layer by electropolishing, rinsing with inorganic acid, and heating.

<9> The method according to <8>, wherein the heating is performed at a temperature of 300° C. to 450° C.

Effects of the Invention

Use of the stainless steel member of the present invention can keep metal not only from eluting as metal ions, but also from separating as particles (metal particles). In particular, iron, chromium, and nickel can be kept from eluting as ions, and from separating as particles (metal particles). Thus, if the stainless steel member of the present invention is used, for example, for an apparatus for producing, storing, filling, or transporting the semiconductor treatment liquid, metal impurities can be kept from mixing into the semiconductor treatment liquid. Further, if the stainless steel member of the present invention is used in a part of a semiconductor production apparatus in contact with the semiconductor treatment liquid, a high quality semiconductor can be produced. In addition, if the stainless steel member of the present invention is used in an apparatus for producing the semiconductor treatment liquid, especially in a part of the apparatus in contact with the semiconductor treatment liquid, such as a transport tube that transports the semiconductor treatment liquid or a storage tank, the semiconductor treatment liquid can be produced with reduced metal impurities.

BRIEF DESCRIPTION OF THE DRAWINGS

FIG. 1 is a graph illustrating change in atomic concentrations in a depth direction of a passivation layer obtained by heating at 350° C. in Example 2.

PREFERRED MODE FOR CARRYING OUT THE INVENTION

<Stainless Steel Member>

The stainless steel member of the present disclosure is a stainless steel member having a passivation layer formed on a surface of a base material made of stainless steel. The passivation layer has a thickness of 2 nm to 20 nm, and a concentration of chromium atoms in an outermost surface of the passivation layer is 0.1 atomic % to 2.3 atomic %.

Stainless steel as the base material is not particularly limited, and any known stainless steel can be used. Among others, an alloy containing 8% by mass or more of nickel is preferable, and austenitic stainless steel containing 8% by mass or more of nickel is more preferable. Examples of the austenitic stainless steel include steel use stainless (SUS) 304 (Ni content: 8% by mass, Cr content: 18% by mass), SUS304L (Ni content: 9% by mass, Cr content: 18% by mass), SUS316 (Ni content: 10% by mass, Cr content: 16% by mass), and SUS316L (Ni content: 12% by mass, Cr content: 16% by mass). If such stainless steel is used, a passivation layer that satisfies the requirements of the present disclosure can be formed relatively easily.

The passivation layer is an oxide film formed on a surface of the base material made of stainless steel, and is specifically an oxide film of metal contained in stainless steel, such as iron and chromium.

In the stainless steel member of the present disclosure, the passivation layer has a thickness of 2 nm to 20 nm. The thickness of the passivation layer within this range facilitates the formation of the passivation layer itself, and elution or separation of metal tends to be reduced for a long time. Further, the elution or separation of metal tends to be reduced even after repeated metal elution tests. From the viewpoint of further reducing the elution or separation of metal, the thickness of the passivation layer is preferably 3 nm to 20 nm, more preferably 3 nm to 10 nm, much more preferably 3 nm to 9 nm.

Based on the results of analysis in the depth direction using X-ray photoelectron spectroscopy (XPS), the thickness of the passivation layer is determined to be a thickness from the outermost surface to a point at which an oxygen concentration in the outermost surface is halved. Conditions for XPS measurement are shown in Examples which will be described later.

In the stainless steel member of the present disclosure, the concentration of chromium atoms in the outermost surface of the passivation layer is 0.1 atomic % to 2.3 atomic %. The "outermost surface" means a position at a depth of 0 nm in the analysis in the depth direction using XPS.

When the concentration of chromium atoms in the outermost surface of the passivation layer is within the range of 0.1 atomic % to 2.3 atomic %, the elution of metal, especially chromium, tends to be reduced. A stainless steel member in which the concentration of chromium atoms in the outermost surface of the passivation layer is less than 0.1 atomic % is difficult to produce as long as a stainless steel material is used. On the other hand, if the concentration of chromium atoms in the outermost surface of the passivation layer exceeds 2.3 atomic %, the elution or separation of metal, especially separation of chromium particles, tends to increase. Taking productivity of the stainless steel member and the effect of reducing the elution or separation of metal into account, the concentration of chromium atoms in the outermost surface of the passivation layer is preferably 0.1 atomic % to 1.0 atomic %, more preferably 0.1 atomic % to 0.6 atomic %, much more preferably 0.4 atomic % to 0.6 atomic %.

Moreover, in the stainless steel member of the present disclosure, the concentration of silicon atoms in the outermost surface of the passivation layer is preferably 0.1 atomic % to 10 atomic %. When the concentration of silicon atoms falls within this range, the elution or separation of metal tends to be further reduced. In particular, the elution or separation of metals other than chromium, e.g., amphoteric metal such as aluminum, tends to be further reduced. From the viewpoint of further reducing the elution or separation of metal, the concentration of silicon atoms in the outermost surface of the passivation layer is preferably 2 atomic % to 10 atomic %, more preferably 5 atomic % to 10 atomic %.

Other components that may be contained in the outermost surface of the passivation layer vary depending on the kind of stainless steel material used. Specifically, the other components include iron which is the main component of the stainless steel material, and other atoms derived from the stainless steel material. Atoms of iron and other elements are present in the form of oxide. As a matter of course, the sum of atoms of chromium, silicon, iron, and other elements in the outermost surface of the passivation layer is 100 atomic %.

The passivation layer is an oxide film of a stainless steel material as described above. Thus, chromium, silicon, iron, and other elements are present in the form of oxide. Therefore, the concentration of oxygen atoms included in the atoms of other elements is 50 atomic % or more.

In the present disclosure, the reason why the passivation layer having the outermost surface containing 0.1 atomic % to 2.3 atomic % of chromium atoms and 0.1 atomic % to 10 atomic % of silicon atoms has the effect of further reducing the elution or separation of metal is unknown, but the present inventors presume the reason as follows. Specifically, at the surface of the passivation layer which is densified by controlling the chromium atom concentration to be 0.1 atomic % to 2.3 atomic %, the presence of a trace amount of silicon atoms (0.1 atomic % to 10 atomic %) is assumed to promote the densification of the iron oxide film. The concentration of silicon atoms can be controlled by conditions for heating which will be described later. Specifically, when stainless steel is heated (baked) at a temperature of 300° C. to 450° C. in an oxidizing atmosphere, the passivation layer containing 0.1 atomic % to 10 atomic % of silicon atoms in the outermost surface can be obtained.

In order to exhibit the effect of further reducing the elution or separation of metal, the passivation layer is preferably made of a metal structure having an average dislocation density of $1.0 \times 10^{14}/m^2$ to $1.0 \times 10^{16}/m^2$, more preferably made of a metal structure having an average dislocation density of $1.0 \times 10^{15}/m^2$ to $1.0 \times 10^{16}/m^2$. The higher the average dislocation density is, the more effectively the elution or separation of metal is reduced. However, the increase in the average dislocation density increases the possibility of elution of metal through a grain boundary from the base material that has not been passivated. For this reason, the average dislocation density in the above-described range is preferable.

The stainless steel member of the present disclosure can keep metal not only from eluting as metal ions, but also from separating as particles (metal particles), and especially can reduce elution or separation of iron, nickel, and chromium. Therefore, the stainless steel member of the present disclosure is advantageously used in a part to be in contact with a semiconductor treatment liquid. When the stainless steel member of the present disclosure is used in a part in contact with the semiconductor treatment liquid, the elution or separation of metal into the semiconductor treatment liquid can be controlled at ppt level. As a matter of course, the portion that makes contact with the semiconductor treatment liquid is the passivation layer of the stainless steel member.

The "semiconductor treatment liquid" used herein is a liquid used in a semiconductor production process. Examples of such liquid include a solvent that dissolves various resist materials, a developing solution, a rinse solution, a pre-wetting solution, a cleaning solution, an etching solution, a stripping solution, and a top coat composition.

These semiconductor treatment liquids include water, an organic solvent, a solvent mixture of water and an organic solvent, and an aqueous solvent (e.g., an alkaline aqueous solution and an acidic aqueous solution).

Examples of the organic solvent include: alcohols such as ethanol and isopropyl alcohol; esters such as butyl acetate; glycols such as ethylene glycol, diethylene glycol, and propylene glycol; aromatics such as toluene and xylene; ketones such as methyl ethyl ketone and acetone; and aliphatic hydrocarbons such as pentane and hexane. These organic solvents may be used alone, or in combination of two or more. The organic solvent compatible with water may be used in the form of an aqueous solution.

Examples of the aqueous solvent include, as described above, an alkaline aqueous solution and an acidic aqueous solution. Specific examples thereof include: an aqueous solution containing alkali such as tetraalkylammonium and ammonia; an aqueous solution containing acid such as hydrofluoric acid, sulfuric acid, and phosphoric acid; and an aqueous solution containing a mixture of two or more kinds of alkaline aqueous solutions or acidic aqueous solutions.

Among them, the stainless steel member of the present disclosure is advantageously used in a part to be in contact with the cleaning solution, the rinse solution, or the developing solution. Examples of the cleaning solution or the rinse solution include ultrapure water and isopropyl alcohol that are used after removal of resist residues or etching residues. Examples of the developing solution include an aqueous solution of tetramethylammonium used in a developing process for removing the resist. If the semiconductor treatment liquid is the ultrapure water, isopropyl alcohol, or tetramethylammonium aqueous solution described above, use of the stainless steel member of the present disclosure can reduce the elution or separation of metal particularly into the semiconductor treatment liquid.

The stainless steel member of the present disclosure is not limited to the applications in the field of semiconductors, and may be applied to other fields requiring high quality products, e.g., medical and food fields.

<Apparatus or Container>

An apparatus or container of the present disclosure is an apparatus or container having a part to be in contact with the semiconductor treatment liquid, in which the part includes the stainless steel member of the present disclosure.

As described above, the stainless steel member of the present disclosure can keep metal not only from eluting as metal ions, but also from separating as particles (metal particles), and especially, can reduce the elution or separation of iron, nickel, and chromium. Thus, the stainless steel member of the present disclosure is advantageously used in an apparatus or container having a part to be in contact with the semiconductor treatment liquid which is required to have high purity.

Examples of the apparatus or the container include: a reaction tank, a distillation column, and a stirrer used in a production process of the semiconductor treatment liquid; a storage tank and a storage container that store the semiconductor treatment liquid; a transport pipe and a filling nozzle used in a filling process using the semiconductor treatment liquid; and a shipping container, a tank lorry, and a package used in a transport process of the semiconductor treatment liquid.

<Method of Producing Stainless Steel Member>

A method of producing the stainless steel member of the present disclosure includes formation of a passivation layer by electropolishing, rinsing with inorganic acid, and heating.

Specifically, the surface of the base material made of stainless steel is treated in the respective steps to form the passivation layer.

The order of the electropolishing, the rinsing with inorganic acid, and the heating is not particularly limited. However, the electropolishing, the rinsing with inorganic acid, and the heating performed in this order facilitate the control of the concentrations of the chromium atoms and silicon atoms in the outermost surface of the passivation layer. In particular, performing these steps in this order allows the concentration of the silicon atoms to be easily controlled.

(Electropolishing)

The electropolishing is a polishing step performed by application of electricity to the base material made of stainless steel immersed in an electrolyte, and may be carried out by any known method. For example, the electricity may be applied to the base material immersed in a mixture of phosphoric acid and sulfuric acid. Alternatively, for example, as described in Japanese Unexamined Patent Application, Publication No. 2015-227501, nitric acid may be used to perform the electropolishing. The electropolishing can smooth the surface of the base material, and can form a chromium oxide film on the surface of the base material.

By the electropolishing, the surface is preferably polished by, for example, 15 μm to 25 μm. The electropolished surface preferably has a surface roughness (Ra) of, for example, 0.10 μm to 0.15 μm.

To perform the electropolishing more effectively, the base material may be buffed in advance of the electropolishing. The buffing smooths the surface of the metal material (surface of the part to be in contact with a liquid), which allows the electropolishing to be performed uniformly.

The buffing may be carried out by any known method without particular limitation. The size of abrasive grains used in the finishing of the buffing is not particularly limited, but is preferably equal to or smaller than #400 because the roughness of the surface of the base material is easily reduced.

(Rinsing with Inorganic Acid)

Inorganic acid used for the rinsing is not particularly limited, but may be hydrochloric acid, nitric acid, sulfuric acid, phosphoric acid, and hydrofluoric acid. These inorganic acids may be used alone, or in combination of two or more.

Among them, inorganic acid containing nitric acid (e.g., a 20% to 30% nitric acid aqueous solution) is preferably used for the rinsing. Due to high oxidizability of nitric acid, rinsing with inorganic acid containing nitric acid can sufficiently remove residues generated by the electropolishing. In addition, the surface of the base material can be easily oxidized, and in particular, oxide layers of iron and chromium can be easily formed.

Hydrofluoric acid has high capability of etching the stainless steel material, and may possibly make the surface of the base material less smooth. Thus, the inorganic acid used for the rinsing preferably contains a smaller amount of hydrofluoric acid, or contains substantially no hydrofluoric acid.

(Heating)

When the base material is heated, an oxide layer, especially a chromium oxide layer, on the surface of the passivation layer can be thinned down, and a dense iron oxide film can grow on the surface. The heating makes it possible to control the thickness of the chromium oxide layer, i.e., the concentration of chromium atoms in the outermost surface of the passivation layer, and to control the concentration of silicon atoms. In particular, the heating is preferably performed after the rinsing of the base material with inorganic acid because the thickness of the chromium oxide layer can be effectively controlled.

The heating is preferably performed in an oxidizing atmosphere containing the air (e.g., in the atmosphere). Heating in the oxidizing atmosphere can promote the growth of the oxide film.

The heating is preferably performed at a temperature of 250° C. to 450° C., more preferably 300° C. to 450° C., much more preferably 300° C. to 400° C. When the heating temperature is set to be equal to or higher than 250° C., the oxide film tends to grow sufficiently. When the heating temperature is set to be equal to or lower than 450° C., the exposure of chromium to the surface from the grain boundary of the passivation layer tends to be suppressed, and the elution of chromium tends to be reduced. Further, when the heating temperature is set to be equal to or lower than 450° C., the production of chromium carbide by a reaction between chromium and carbon contained in stainless steel tends to be reduced. Chromium carbide, which is brittle, can be a source of metal component-derived particles in the semiconductor treatment liquid.

Heating time is not particularly limited, and may be determined so that the chromium atoms in the outermost surface of the passivation layer have a concentration of 0.1 atomic % to 2.3 atomic %. At this time, the time is preferably determined so that the silicon atoms are contained at a concentration of 0.1 atomic % to 10 atomic %. In general, the time is preferably 0.5 hours to 10 hours, more preferably one hour to three hours, in view of economy. The heating time within this range makes it possible to produce the stainless steel member on which the iron oxide film is sufficiently grown and the elution or separation of metal is reduced.

The heating may be performed under reduced pressure. Heating under reduced pressure can further promote the thinning of the chromium oxide layer, and tends to shorten the heating time.

As can be seen, by the electropolishing, the rinsing with inorganic acid, and the heating performed on the base material made of stainless steel, the passivation layer that satisfies the requirements of the present disclosure can be easily formed. The stainless steel member thus obtained reduces the elution or separation of metal.

<Method of Producing Semiconductor Treatment Liquid>

A method of producing a semiconductor treatment liquid according to the present disclosure includes using an apparatus having a part including the stainless steel member of the present disclosure in producing the semiconductor treatment liquid.

A common semiconductor treatment liquid is produced by reaction in a reaction tank and purification in a distillation column, both of which are generally performed under high-temperature and high-pressure conditions. As a result, a large amount of metal may elute from the reaction tank or the distillation column. If the stainless steel member of the present disclosure is used in the parts of such production apparatuses in contact with the liquid, metal impurities in the semiconductor treatment liquid can be controlled at ppt level.

<Method of Storing Semiconductor Treatment Liquid>

A method of storing the semiconductor treatment liquid according to the present disclosure includes storing the semiconductor treatment liquid in a container having a part including the stainless steel member of the present disclosure, wherein the part is in contact with the liquid. Storing the semiconductor treatment liquid in the container having the liquid contact part including the stainless steel member of the present disclosure can reduce the elution or separation of metal into the semiconductor treatment liquid.

As can be seen, the stainless steel member of the present disclosure can control the elution or separation of metal at ppt level. Thus, if the semiconductor treatment liquid is produced, stored, or transported using the stainless steel member, the metal impurities can be sufficiently kept from increasing. This clearly indicates that the stainless steel member of the present disclosure can be advantageously used for a member of an apparatus or container that handles the semiconductor treatment liquid.

EXAMPLES

The present invention will be described below in more detail by way of examples, but the examples do not limit the present invention.

<Measurement Methods>

(Method of Measuring Atomic Concentration in Outermost Surface of Passivation Layer)

The atomic concentrations of iron, chromium, and silicon in the outermost surface of the passivation layer were measured by X-ray Photoelectron Spectroscopy (XPS). The XPS instrument used was a PHI5500 X-ray photoelectron spectroscope manufactured by ULVAC-PHI, Inc. Al-Kα 330 W was used as an X-ray source. From the peak intensity of photoelectron number of every element detected, surface atomic concentrations of chromium, silicon, and iron were calculated using relative sensitivity factors provided by ULVAC-PHI, Inc. The detection was performed in a range having a diameter of 800 μm. The detection range was set with a take-off angle of 45°, and a detection depth of about 5 nm.

(Method of Measuring Thickness of Passivation Layer)

The thickness of the passivation layer was calculated from the results of the analysis in the depth direction using XPS described above. Sputtering was performed using $Ar^+$ ions at a rate of about 0.5 nm/min in terms of $SiO_2$. In an oxygen concentration distribution in the depth direction obtained by the XPS measurement, a depth from the outermost surface to a point at which the atomic concentration of oxygen in the outermost surface was halved was calculated as the thickness of the passivation layer.

(Method of Measuring Average Dislocation Density of Passivation Layer)

The average dislocation density of the passivation layer was measured using a half-value width obtained by X-ray diffraction (XRD). First, from X-ray diffraction data obtained by a θ-2θ measurement performed on a sample surface, an angle of diffraction peak and a half-value width of diffraction intensity were obtained by approximation using Lorentzian function on {111} plane, {200} plane, {220} plane, and {311} plane. Then, the dislocation density was calculated using modified Williamson-Hall and modified Warren-Averbach equations.

At that time, as an anisotropic elastic constant required for obtaining a contrast factor, a known value of Fe-18% Cr-14% Ni steel (C11=1.98, C12=1.25, C44=1.22) was used to calculate an average contrast factor (Ch00=0.345). A Burgers vector was set to be 0.249 nm from a lattice constant. Note that the X-ray from a Cu tube penetrates the sample by about 50 μm at the maximum from the surface. Thus, the average dislocation density of a depth of about 50 μm from the surface is obtained.

(Method of Measuring Amount of Metal Elution)

Metal eluted into isopropyl alcohol from sample pieces (members having passivation layers) produced under the conditions described in Examples and Comparative Examples was evaluated as an amount of metal elution. In a metal elution test, the sample pieces were immersed and retained in isopropyl alcohol at room temperature for two weeks. About 500 mL of isopropyl alcohol after retention was placed in an eggplant-shaped flask, concentrated and dried into solid in a rotary evaporator, and then recovered in two steps using about 25 mL of 0.1N nitric acid. The amount of metal elution in the recovered 0.1 N nitric acid solution was quantified using an inductively coupled plasma mass spectrometer (ICP-MS). At that time, a concentration rate was calculated from the weight of isopropyl alcohol before the concentration and the weight of the 0.1 N nitric acid solution after the recovery, and was converted to the amount of metal elution per weight of isopropyl alcohol. The amount of metal elution was rounded off to the second decimal place.

Examples 1 to 5 and Comparative Examples 1 to 4 (Production of Sample Pieces)

SUS304 stainless steel of 30 mm in length, 120 mm in width, and 3 mm in thickness was prepared.

(Electropolishing)

The stainless steel was electropolished with an electrolyte of phosphoric acid and sulfuric acid at an electrolytic current density of 20 $A/dm^2$ to 60 $A/dm^2$ to remove the material by about 20 μm from the surface.

(Rinsing with Inorganic Acid)

Then, an affected layer on the surface of the electropolished stainless steel was rinsed with inorganic acid (a 20% to 30% nitric acid aqueous solution) to reduce the material by 10 μm to 50 μm from the surface. After the removal of the affected layer, precision cleaning was performed with pure water at a resistivity of 1 MΩ·cm or more.

(Heating)

Heating was performed in the atmosphere at an atmospheric pressure and a temperature of 250° C. to 650° C. for two hours to obtain a sample piece on a surface of which a passivation layer was formed.

Other sample pieces (members having passivation layers), such as an untreated sample piece (unheated sample piece: Comparative Example 1), and a steam-treated sample piece (a sample piece not heated but treated with steam), were prepared under the production conditions shown in Table 1. Table 1 shows whether the electropolishing was done or not, the kind of inorganic acid used in the rinsing, and the temperature and time for the heating.

TABLE 1

| | | | Heating | |
| --- | --- | --- | --- | --- |
| | Electropolishing | Rinsing | Heating temperature [° C.] | Heating time [Time] |
| Example 1 | Done | Nitric acid | 300 | 2 |
| Example 2 | Done | Nitric acid | 350 | 2 |
| Example 3 | Done | Nitric acid | 400 | 2 |
| Example 4 | Done | Nitric acid | 450 | 2 |

TABLE 1-continued

| | Electropolishing | Rinsing | Heating temperature [° C.] | Heating time [Time] |
|---|---|---|---|---|
| Example 5 | Done | Nitric acid | 250 | 2 |
| Comparative Example 1 | Done | Nitric acid | Unheated | — |
| Comparative Example 2 | Done | Nitric acid | Steam-treated | — |
| Comparative Example 3 | Done | Nitric acid | 200 | 2 |
| Comparative Example 4 | Done | Nitric acid | 650 | 2 |

<Evaluation>
(Measurement of Composition Ratio of Outermost Surface of Passivation Layer and Thickness of Passivation Layer)

Each of the sample pieces of Examples 1 to 5 and Comparative Examples 1 to 4 was subjected to surface analysis by XPS to measure the composition ratio of the outermost surface of the passivation layer and the thickness of the passivation layer. The "composition ratio of the outermost surface of the passivation layer" means a composition ratio of the passivation layer at the depth of 0 nm based on the results of the analysis in the depth direction using XPS. Table 2 shows the results. FIG. 1 shows the results of the analysis in the depth direction using XPS performed on the sample of Example 2. As shown in FIG. 1, sputtering time of about nine minutes was taken until the oxygen concentration was halved. Since the sputtering was performed at a rate of about 0.5 nm/min (in terms of $SiO_2$), the thickness of the passivation layer of Example 2 was calculated to be about 5 nm (in terms of $SiO_2$). The passivation layer of Example 2 had an average dislocation density of $2.3 \times 10^{15}/m^2$.

TABLE 2

| | Composition ratio of passivation layer | | | Thickness of passivation layer |
|---|---|---|---|---|
| | Fe [at %] | Cr [at %] | Si [at %] | (in terms of $SiO_2$) [nm] |
| Example 1 | 16.5 | 0.6 | 8.9 | 3 |
| Example 2 | 18.7 | 0.4 | 7.4 | 5 |
| Example 3 | 19.2 | 0.5 | 5.1 | 7 |
| Example 4 | 21.6 | 0.5 | 3.3 | 9 |
| Example 5 | 13.9 | 1.7 | At or below lower limit of detection | 2 |
| Comparative Example 1 | 49.9 | 13.7 | At or below lower limit of detection | Not measured |
| Comparative Example 2 | 13.3 | 39.1 | At or below lower limit of detection | Not measured |
| Comparative Example 3 | 8.3 | 3.8 | At or below lower limit of detection | 1 |
| Comparative Example 4 | 6.6 | 2.5 | 1.2 | 24 |

(Metal Elution Test)

Each of the sample pieces of Examples 1 to 5 and Comparative Examples 1, 2, and 4 was immersed and retained in a resin bottle filled with one liter of high purity isopropyl alcohol (Tokuyama Corporation, electronic industrial grade) at room temperature for two weeks. After two weeks, the amount of metal eluted from each sample piece into the high purity isopropyl alcohol was evaluated using the above-described inductively coupled plasma mass spectrometer (ICP-MS). Table 3 shows the results. The passivation layer of Comparative Example 3 was so thin as 1 nm, and no metal elution test was performed.

The metal elution test of retaining the sample piece at room temperature for two weeks was repeated three times. Regarding iron, nickel, and chromium, not only the elution characteristics in the first test, but change in the amount of metal elution with time was also checked. Table 4 shows the results. The symbol "-" in Tables 3 and 4 indicates that no measurement was performed.

TABLE 3

| | | Example 1 | Example 2 | Example 3 | Example 4 | Example 5 |
|---|---|---|---|---|---|---|
| Results of metal elution test [ppt] | Ag | 2.2 | 0.3 | 0.0 | 1.4 | — |
| | Al | 0.2 | 0.1 | 0.9 | 0.0 | 0.0 |
| | Au | 0.0 | 0.0 | 0.2 | 0.0 | — |
| | Ba | 0.1 | 0.0 | 0.5 | 0.0 | — |
| | Cd | 0.0 | 0.0 | 0.0 | 0.0 | 0.0 |
| | Co | 0.0 | 0.0 | 0.0 | 0.0 | 0.4 |
| | Cr | 0.4 | 0.4 | 1.7 | 5.2 | 1.5 |
| | Cu | 0.3 | 0.5 | 0.6 | 0.2 | 0.2 |
| | Fe | 0.8 | 1.0 | 0.8 | 0.1 | 3.4 |
| | Ga | 0.0 | 0.0 | 0.0 | 0.0 | — |
| | K | 1.7 | 1.7 | 4.0 | 2.3 | 0.0 |
| | Li | 0.0 | 0.0 | 0.0 | 0.0 | 0.0 |
| | Mg | 0.2 | 0.1 | 0.3 | 0.1 | 0.2 |
| | Mn | 0.0 | 0.0 | 0.0 | 0.0 | 8.9 |
| | Ni | 0.1 | 0.1 | 0.3 | 0.1 | 3.6 |
| | Pb | 0.0 | 0.0 | 0.0 | 0.0 | 0.0 |
| | Sn | 0.0 | 0.0 | 0.0 | 0.0 | — |
| | Sr | 0.0 | 0.0 | 0.0 | 0.0 | — |
| | Zn | 0.2 | 0.7 | 0.4 | 0.2 | 0.3 |
| | Ti | 0.1 | 0.0 | 0.6 | 0.2 | 0.0 |
| | Bi | 0.0 | 0.0 | 0.0 | 0.0 | — |
| | Mo | 0.3 | 0.5 | 0.0 | 0.0 | — |
| | Tl | 0.1 | 0.0 | 0.0 | 0.0 | — |
| | In | 0.0 | 0.0 | 0.0 | 0.0 | — |

| | | Comparative Example 1 | Comparative Example 2 | Comparative Example 3 | Comparative Example 4 |
|---|---|---|---|---|---|
| Results of metal elution test [ppt] | Ag | — | — | — | — |
| | Al | 1.8 | 1.2 | — | 2.0 |
| | Au | — | — | — | — |
| | Ba | — | — | — | — |
| | Cd | — | — | — | 0.0 |
| | Co | — | — | — | 4.7 |
| | Cr | 36.7 | 129.7 | — | 29.9 |
| | Cu | 1.1 | 1.0 | — | 37.4 |
| | Fe | 8.6 | 5.6 | — | 32.6 |
| | Ga | — | — | — | — |
| | K | 6.3 | 2.4 | — | 2.0 |
| | Li | — | — | — | 0.0 |
| | Mg | 3.0 | 5.7 | — | 0.4 |
| | Mn | — | — | — | 51.2 |
| | Ni | 6.3 | 8.3 | — | 71.2 |
| | Pb | — | — | — | 0.0 |
| | Sn | — | — | — | — |
| | Sr | — | — | — | — |
| | Zn | 1.9 | 9.0 | — | 0.2 |
| | Ti | — | — | — | 0.0 |
| | Bi | — | — | — | — |
| | Mo | — | — | — | — |
| | Tl | — | — | — | — |
| | In | — | — | — | — |

TABLE 4

| | Results of metal elution test [ppt] | | | | | | | | |
|---|---|---|---|---|---|---|---|---|---|
| | First | | | Second | | | Third | | |
| | Fe | Cr | Ni | Fe | Cr | Ni | Fe | Cr | Ni |
| Example 1 | 0.8 | 0.4 | 0.1 | 0.4 | 0.2 | 0.1 | 0.6 | 0.2 | 0.3 |
| Example 2 | 1.0 | 0.4 | 0.1 | 0.5 | 0.6 | 0.2 | 0.6 | 0.5 | 0.2 |
| Example 3 | 0.8 | 1.7 | 0.3 | 0.3 | 0.4 | 0.1 | 0.8 | 0.4 | 0.3 |
| Example 4 | 0.1 | 5.2 | 0.1 | 1.0 | 2.4 | 0.4 | 0.2 | 1.1 | 0.2 |
| Example 5 | 3.4 | 1.5 | 3.6 | 4.7 | 1.0 | 7.5 | 0.5 | 0.0 | 0.6 |
| Comparative Example 1 | 8.6 | 36.7 | 6.3 | 1.6 | 19.7 | 12.1 | 1.0 | 16.0 | 5.0 |
| Comparative Example 2 | 5.6 | 129.7 | 8.3 | 2.3 | 71.3 | 9.7 | 0.8 | 35.0 | 3.7 |
| Comparative Example 3 | — | — | — | — | — | — | — | — | — |
| Comparative Example 4 | 32.6 | 29.9 | 71.2 | 1408.2 | 25.6 | 232.6 | 690.5 | 19.0 | 93.7 |

As shown in Table 3, the sample pieces of Examples in which the concentration of chromium atoms in the outermost surface of the passivation layer was 0.1 atomic % to 2.3 atomic % showed less elution of metal than those of Comparative Examples. Further, the sample pieces in which the concentration of silicon atoms in the outermost surface of the passivation layer was 0.1 atomic % to 10 atomic % showed less elution of iron, nickel, and chromium.

As shown in Table 4, the change in the amount of metal elution was small even if the metal elution test was repeated performed. This indicates that the stainless steel members of Examples can be advantageously used in parts to be in contact with the semiconductor treatment liquid.

(Storage Stability Test)

The sample piece of Example 2 was immersed and retained in a resin bottle filled with one liter of high purity isopropyl alcohol (Tokuyama Corporation, electronic industrial grade) at room temperature for two months. The amounts of metal elution before and after the storage were evaluated using the above-described inductively coupled plasma mass spectrometer (ICP-MS) to calculate an increase in the amount of metal elution after the storage. The storage stability test was performed twice. Table 5 shows the results. The passivation layer of Comparative Example 3 was as thin as 1 nm, and no storage stability test was performed.

TABLE 5

| | Results of two-month storage stability test [ppt] | | | | | | |
|---|---|---|---|---|---|---|---|
| | Li | Mg | Al | K | Ti | Cr | Mn |
| Example 2 (First) | 0.0 | 0.1 | 0.0 | 0.2 | 0.0 | 0.0 | 0.0 |
| Example 2 (Second) | 0.0 | 0.2 | 0.4 | 0.6 | 0.0 | 0.0 | 0.2 |
| Example 2 (Average) | 0.0 | 0.2 | 0.2 | 0.4 | 0.0 | 0.0 | 0.1 |

| | Results of two-month storage stability test [ppt] | | | | | | |
|---|---|---|---|---|---|---|---|
| | Fe | Ni | Co | Cu | Zn | Cd | Pb |
| Example 2 (First) | 0.1 | 0.0 | 0.1 | 0.0 | 0.1 | 0.0 | 0.1 |
| Example 2 (Second) | 0.3 | 0.0 | 0.0 | 0.1 | 0.1 | 0.0 | 0.0 |
| Example 2 (Average) | 0.2 | 0.0 | 0.1 | 0.1 | 0.1 | 0.0 | 0.1 |

As shown in Table 5, the amount of metal elution hardly increased even after two-month storage in the high purity isopropyl alcohol at room temperature.

The invention claimed is:

1. An austenite stainless steel member comprising:

a base material made of austenite stainless steel; and a passivation layer formed on a surface of the base material made of austenite stainless steel, wherein the passivation layer has a thickness of 2 nm to 20 nm, a concentration of chromium atoms in an outermost surface of the passivation layer is 0.1 atomic % to 1.0 atomic %, and a concentration of silicon atoms in the outermost surface of the passivation layer is 2 atomic % to 10 atomic %.

2. The austenite stainless steel member according to claim 1 which is for use in a part to be in contact with a semiconductor treatment liquid.

3. The austenite stainless steel member according to claim 1, wherein the passivation layer has a thickness of 3 nm to 20 nm.

4. An apparatus having a part to be in contact with a semiconductor treatment liquid, wherein the part comprises the austenite stainless steel member according to claim 1.

5. A method of producing a semiconductor treatment liquid, the method comprising:

using the apparatus according to claim 4 in producing a semiconductor treatment liquid.

6. A method of storing a semiconductor treatment liquid, the method comprising:

storing the semiconductor treatment liquid in a container comprising the austenite stainless steel member according to claim 1.

7. A method of producing the austenite stainless steel member according to claim 1, the method comprising:

forming the passivation layer by electropolishing, rinsing with inorganic acid, and heating, wherein the heating is performed at a temperature of 300° C. to 450° C. in an oxidizing atmosphere.

8. The apparatus according to claim 4, which is a reaction tank, distillation column, stirrer, transport pipe, or storage tank for use in a semiconductor treatment liquid producing process.

9. A container having a part to be in contact with a semiconductor treatment liquid, wherein the part comprises the austenite stainless steel member according to claim 1.

* * * * *